US012537155B2

(12) United States Patent
Wu

(10) Patent No.: US 12,537,155 B2
(45) Date of Patent: Jan. 27, 2026

(54) NON-POLARIZED SNAP-ON ELECTROMAGNETIC RELAY

(71) Applicant: SONG CHUAN PRECISION CO., LTD., New Taipei (TW)

(72) Inventor: Sung-Jen Wu, New Taipei (TW)

(73) Assignee: SONG CHUAN PRECISION CO., LTD., New Taipei (TW)

( * ) Notice: Subject to any disclaimer, the term of this patent is extended or adjusted under 35 U.S.C. 154(b) by 253 days.

(21) Appl. No.: 18/380,209

(22) Filed: Oct. 16, 2023

(65) Prior Publication Data

US 2025/0125110 A1 Apr. 17, 2025

(51) Int. Cl.
*H01H 50/32* (2006.01)
*H01H 50/38* (2006.01)
*H01H 50/56* (2006.01)

(52) U.S. Cl.
CPC .......... *H01H 50/321* (2013.01); *H01H 50/38* (2013.01); *H01H 50/56* (2013.01)

(58) Field of Classification Search
CPC ...... H01H 50/321; H01H 50/38; H01H 50/56; H01H 9/443
USPC .......................................................... 335/201
See application file for complete search history.

(56) References Cited

U.S. PATENT DOCUMENTS

| | | | | |
|---|---|---|---|---|
| 11,257,647 | B1 * | 2/2022 | Liao | H01H 50/642 |
| 2015/0054605 | A1 * | 2/2015 | Kubono | H01H 9/443 335/177 |
| 2016/0027602 | A1 * | 1/2016 | Hasegawa | H01H 51/2236 335/189 |
| 2017/0162354 | A1 * | 6/2017 | Kubono | H01H 50/54 |
| 2018/0096810 | A1 * | 4/2018 | Murakoshi | H01H 51/2227 |
| 2018/0182584 | A1 * | 6/2018 | Iwamoto | H01H 50/18 |
| 2019/0304726 | A1 * | 10/2019 | Ishikawa | H01H 1/54 |
| 2020/0105488 | A1 * | 4/2020 | Ikushima | H01H 9/443 |
| 2022/0223362 | A1 * | 7/2022 | Park | H01H 9/443 |
| 2022/0301797 | A1 * | 9/2022 | Park | H01H 50/38 |
| 2023/0326696 | A1 * | 10/2023 | Shimizu | H01H 50/38 335/201 |

* cited by examiner

*Primary Examiner* — Shawki S Ismail
*Assistant Examiner* — Lisa N Homza
(74) *Attorney, Agent, or Firm* — Fei-hung Yang

(57) ABSTRACT

A non-polarized snap-on electromagnetic relay capable of arbitrarily connecting two electrodes for electrical conduction to execute a charging or discharging operation without the need of considering positive and negative polarity includes a base, a solenoid coil assembly, a link assembly, a fixed contact assembly, and a movable contact assembly, and all these assemblies are installed on the base. The base of the electromagnetic relay further includes a barrier block disposed in the fixed contact assembly and symmetrically arranged between two fixed conductive plates, and a movable spring plate of the movable contact assembly is set across the barrier block, so that the stroke movement of the movable contact on the movable spring plate takes place on two sides of the barrier block, and the barrier block contains a strike-arc magnet.

11 Claims, 12 Drawing Sheets

NON-POLARIZED SNAP-ON ELECTROMAGNETIC RELAY

BACKGROUND

Technical Field

The present disclosure relates to the field of relays, and more particularly to a non-polarized snap-on electromagnetic relay that can arbitrarily connect two electrodes for electrical conduction without the need of considering positive and negative polarity.

Description of Related Art

Traditional electromagnetic relay of an electronic product or circuit system must strictly follow the way of connecting positive and negative polarity. In other words, it is necessary to determine each pin of the electromagnetic relay to be connected to a positive or negative terminal of the electronic circuit is determined first during manufacturing, and then the positive and negative electrode pins are connected in a correct way to the positive and negative terminals of the electronic circuit respectively according to the labelling of the electromagnetic relay. In the event that the electronic circuit generates a reverse electrical conduction, it will cause the electromagnetic relay to produce a large arc effect, resulting in severe damage or even destruction of the electromagnetic relay caused by the arc energy. Therefore, all traditional electromagnetic relays must be connected to the positive and negative terminals of the electronic circuits according to the positive and negative indications, and shall not be assembled reversely with the positive and negative terminals, or operated in the reverse electrical conduction of the electronic circuits.

SUMMARY

It is a primary objective of the present disclosure to this disclosure a non-polarized snap-on electromagnetic relay that can arbitrarily connect two electrodes for electrical conduction to execute a charging or discharging operation without the need of considering positive and negative polarity.

To achieve the aforementioned and other objectives, the present disclosure provides a non-polarized snap-on electromagnetic relay that can arbitrarily connect two electrodes for electrical conduction to execute a charging or discharging operation without the need of considering positive and negative polarity. The non-polarized snap-on electromagnetic relay includes a base, a solenoid coil assembly, a link assembly, a fixed contact assembly and a movable contact assembly, and the solenoid coil assembly, the link assembly, the fixed contact assembly and the movable contact assembly are installed to the base; and the link assembly is installed on a side of the solenoid coil assembly and operated according to the driving state of the solenoid coil assembly. The non-polarized snap-on electromagnetic relay is characterized in that the fixed contact assembly includes two fixed conductive plates, a first fixed contact and a second fixed contact, the two fixed conductive plates are symmetrically installed with an end extending out of the base, the first fixed contact is disposed on any one of the fixed conductive plates, and the second fixed contact is disposed on the other one of the fixed conductive plate; the movable contact assembly includes a movable spring plate, a first movable contact and a second movable contact, the movable spring plate has a gap formed by inwardly extending its end, the first movable contact and the second movable contact are disposed on the movable spring plate and arranged on two sides of the gap, the first fixed contact and the second fixed contact are configured to be corresponsive to each other, the movable spring plate has a connection section disposed at an end away from the first movable contact and the second movable contact, the connection section is linked by the link assembly to allow the first movable contact and the second movable contact to contact with or detach from the first fixed contact and the second fixed contact; the base further includes a barrier block disposed between the two fixed conductive plates, the movable spring plate is set across the barrier block, so that the stroke movement of the first movable contact and the second movable contact takes place on the two sides of the barrier block, and the barrier block contains a strike-arc magnet.

Lightning is a kind of electric arc in nature, so that the discharge effect at the tip of a lightning conductor is preferably utilized to attract lightning strikes and prevent surrounding objects from being damaged by lightning. This disclosure guides the electric arc towards the arc receiving portion by the strike-arc magnet and stretches the electric arc to reduce the energy density of the electric arc, and the discharge sections on the arc receiving portion attracts the stretched electric arc, so that the arc receiving portion receives the energy of the electric arc (such as heat energy) to extinguish and prevent the surrounding objects in the relay from being damaged by electric arc.

DETAILED DESCRIPTION

This disclosure will now be described in more detail with reference to the accompanying drawings that show various embodiments of this disclosure.

Figure 1A:
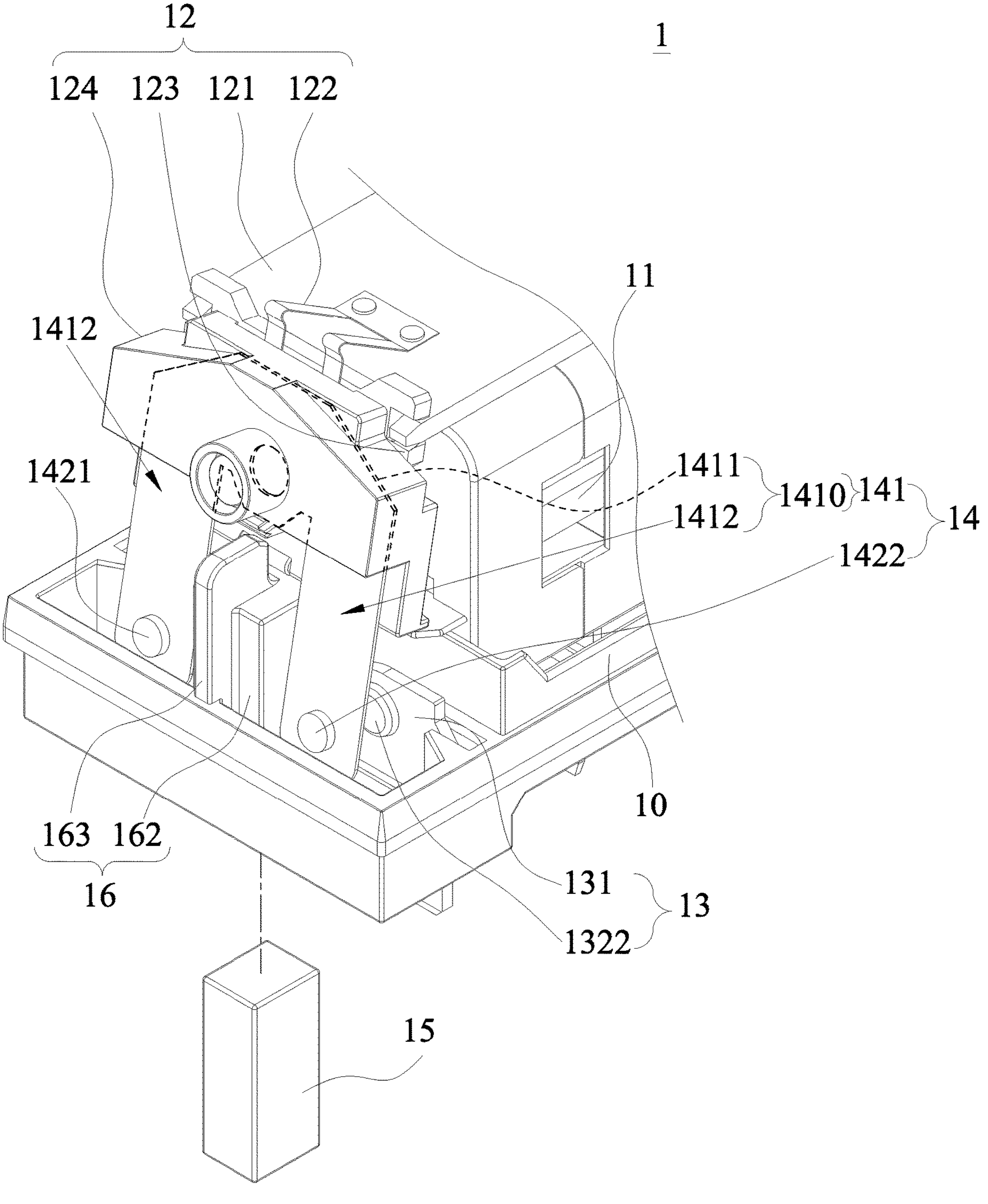
FIG. 1A is a first partial exploded view showing a partial structure of the present disclosure.
Figure 1B:
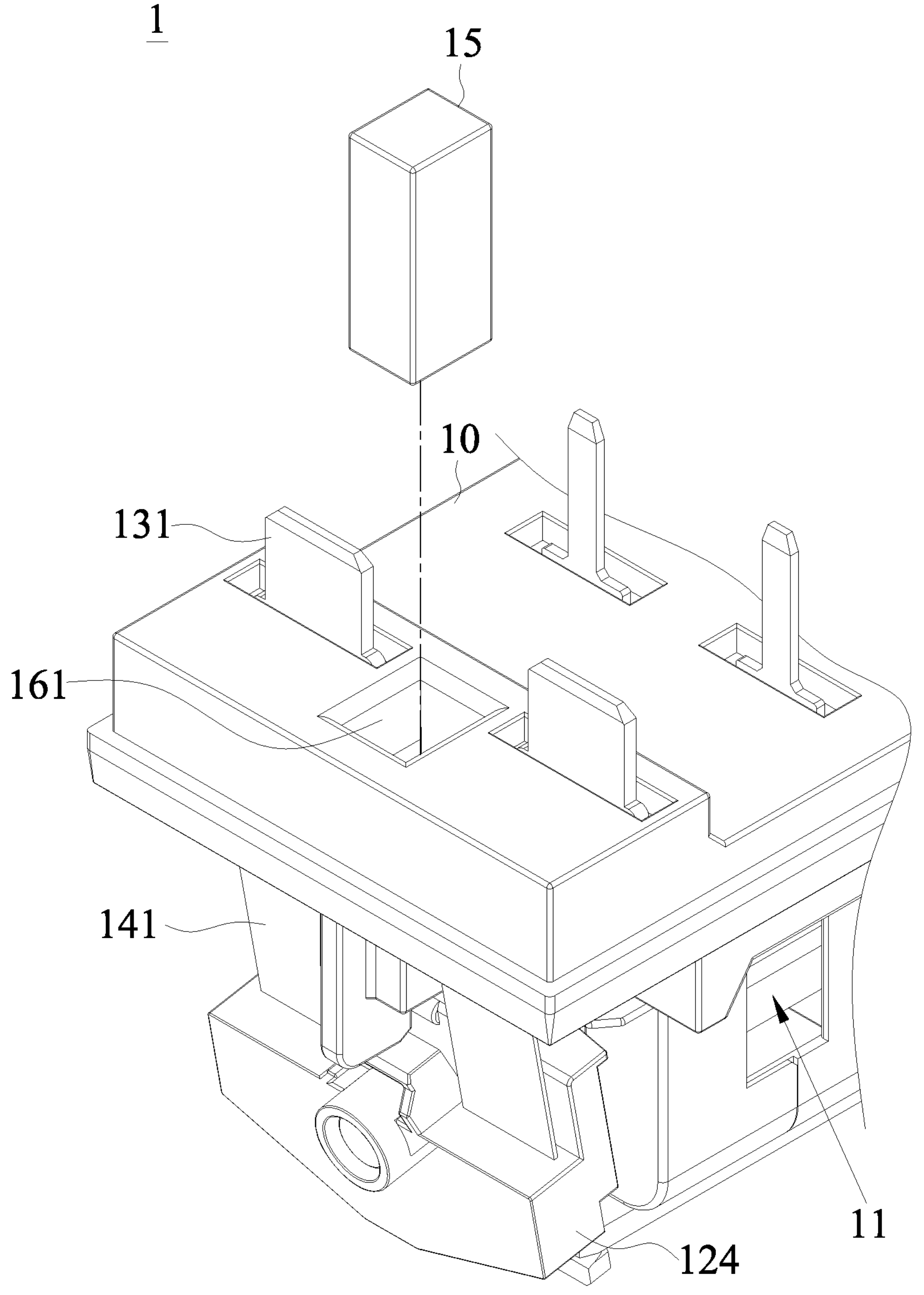
FIG. 1B is a second partial exploded view showing a partial structure of the present disclosure.
Figure 1C:
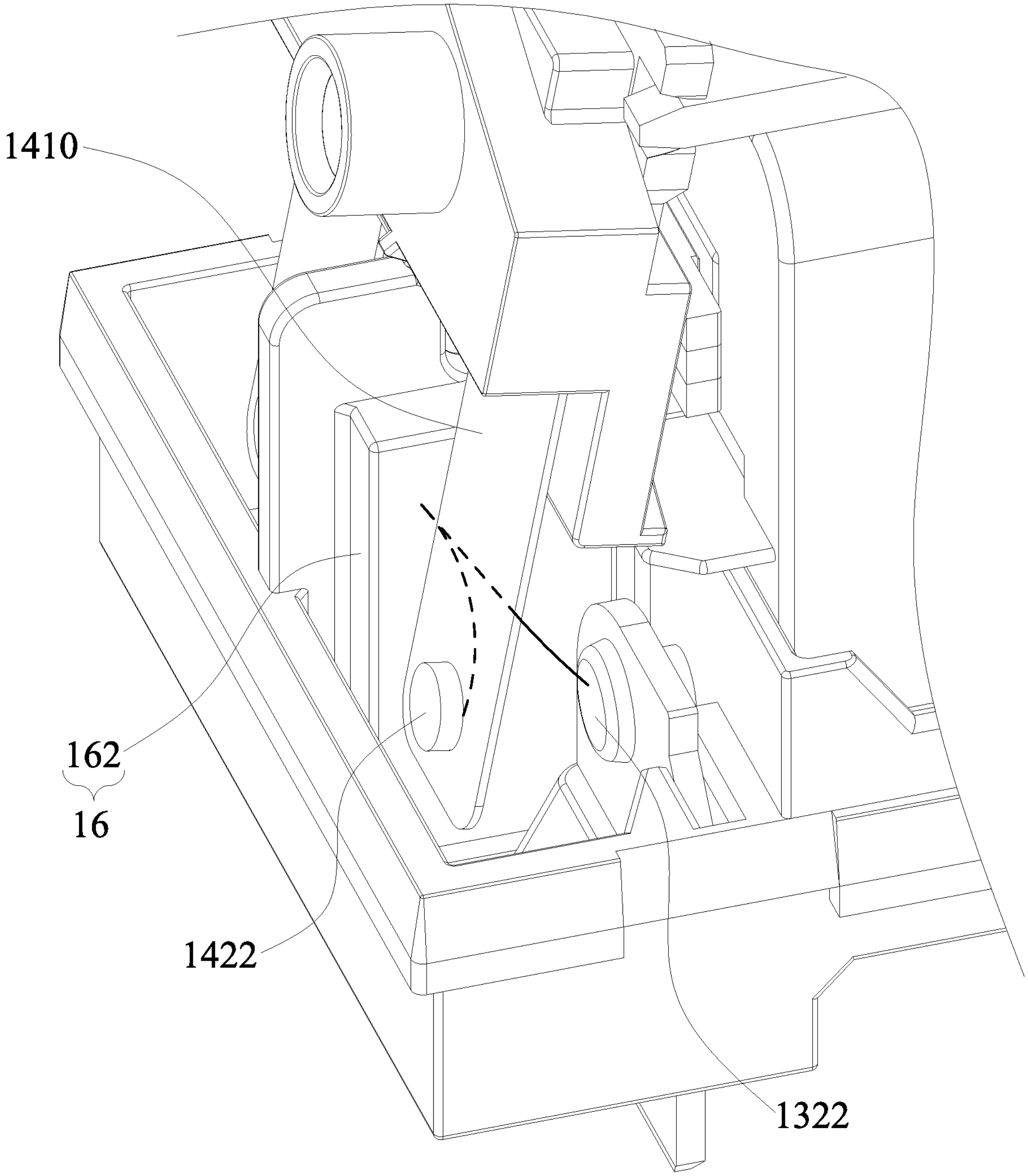
FIG. 1C is a first perspective view showing an application status of the present disclosure.

With reference to FIGS. 1A to 6B, the non-polarized snap-on electromagnetic relay 1 of this disclosure that can arbitrarily connect two electrodes for electrical conduction to execute a charging/discharging operation without the need of considering positive and negative polarity. The non-polarized snap-on electromagnetic relay 1 includes a base 10, a solenoid coil assembly 11, a link assembly 12, a fixed contact assembly 13 and a movable contact assembly 14. The solenoid coil assembly 11, the link assembly 12, the fixed contact assembly 13 and the movable contact assembly 14 are installed on the base 10; the link assembly 12 is disposed on a side of the solenoid coil assembly 11 and operated according to the driving status of the solenoid coil assembly 11. The non-polarized snap-on electromagnetic relay 1 is characterized in that the fixed contact assembly 13 includes two fixed conductive plates 131, a first fixed contact 1321 and a second fixed contact 1322, the two fixed conductive plates 131 are symmetrically installed with an end extending out of the base 10, the first fixed contact 1321 and the second fixed contact 1322 are disposed on the fixed conductive plate 131; the movable contact assembly 14 includes a movable spring plate 141, a first movable contact 1421 and a second movable contact 1422, the movable spring plate 141 has a gap formed by inwardly extending its end, the first movable contact 1421 and the second movable contact 1422 are disposed on the movable spring plate 141 and on two sides of the gap and configured to be corresponsive to the first fixed contact 1321 and the second fixed contact 1322 respectively, the movable spring plate 141 has a connection section 1411 defined at an end away from the first movable contact 1421 and the second movable contact 1422, and the connection section 1411 is linked by the link assembly 12, so that the first movable contact 1421 and the second movable contact 1422 contact with or detach from the first fixed contact 1321 and the second fixed contact 1322 respectively. The base 10 of the non-polarized snap-on electromagnetic relay further includes a barrier block 16 disposed between the two fixed conductive plates 131, and the movable spring plate 141 is set across the barrier block 16, so that the stroke movement of the first movable contact 1421 and the second movable contact 1422 takes place on two sides of the barrier block 16, and the barrier block 16 contains a strike-arc magnet 15, thereby achieving the arc blow performance to attenuate the energy of the electric arc during operation by the effect of the barrier block 16 and the strike-arc magnet 15, and further achieving the effect of extinguishing the electric arc. In FIG. 1C, when the second movable contact 1422 and the second fixed contact 1322 are detached or contacted (FIG. 1 shows the detachment of the second movable contact 1422 and the second fixed contact 1322), the generated electric arc (indicated by the arc in FIG. 1C) attracts the electric arc to the position of the barrier block 16 by the effect of the barrier block 16 and the strike-arc magnet 15. In the meantime, the aforementioned linkage feature makes the strike-arc magnet 15 and the barrier block 16 form a state similar to a one-piece structure which is more helpful to isolate and eliminate the electric arc. Specifically, the bottom of the barrier block 16 can be formed with an accommodating slot 161 for installing the strike-arc magnet 15. Preferably, the base 10 can be asymmetrically structured, so that the area having the barrier block 16 (that is the front side of the base 10 as shown in FIG. 1A) has a depth slightly greater than the area having the solenoid coil assembly 11 (that is the rear side of the base 10 as shown in FIG. 1A). As a result, the overall volume of the non-polarized snap-on electromagnetic relay 1 can be reduced by shortening the height of the rear area of the base 10.

Through the above structure, the non-polarized snap-on electromagnetic relay 1 can achieve the "non-polarized" effect, where the term "non-polarized" means that two electrodes can be arbitrarily connected for electrical conduction to execute a charging or discharging operation without the need of considering positive and negative polarity. When the structure of the non-polarized snap-on electromagnetic relay 1 is limited to the aforementioned conditions, the part of the two fixed conductive plates 131 extended out of the base 10 can be freely assembled and fixed to the electrodes to be connected, regardless of the conducting direction of the current. The electric arc generated during the operation of the non-polarized snap-on electromagnetic relay 1 can be smoothly eliminated by the effect of the barrier block 16 and the strike-arc magnet 15 inside the barrier block 15 to effectively changing the unidirectional current application mode of the conventional snap-on electromagnetic relay and preventing damage to the relay in the event of an electric current generated by a current reversal.

Figure 5A:
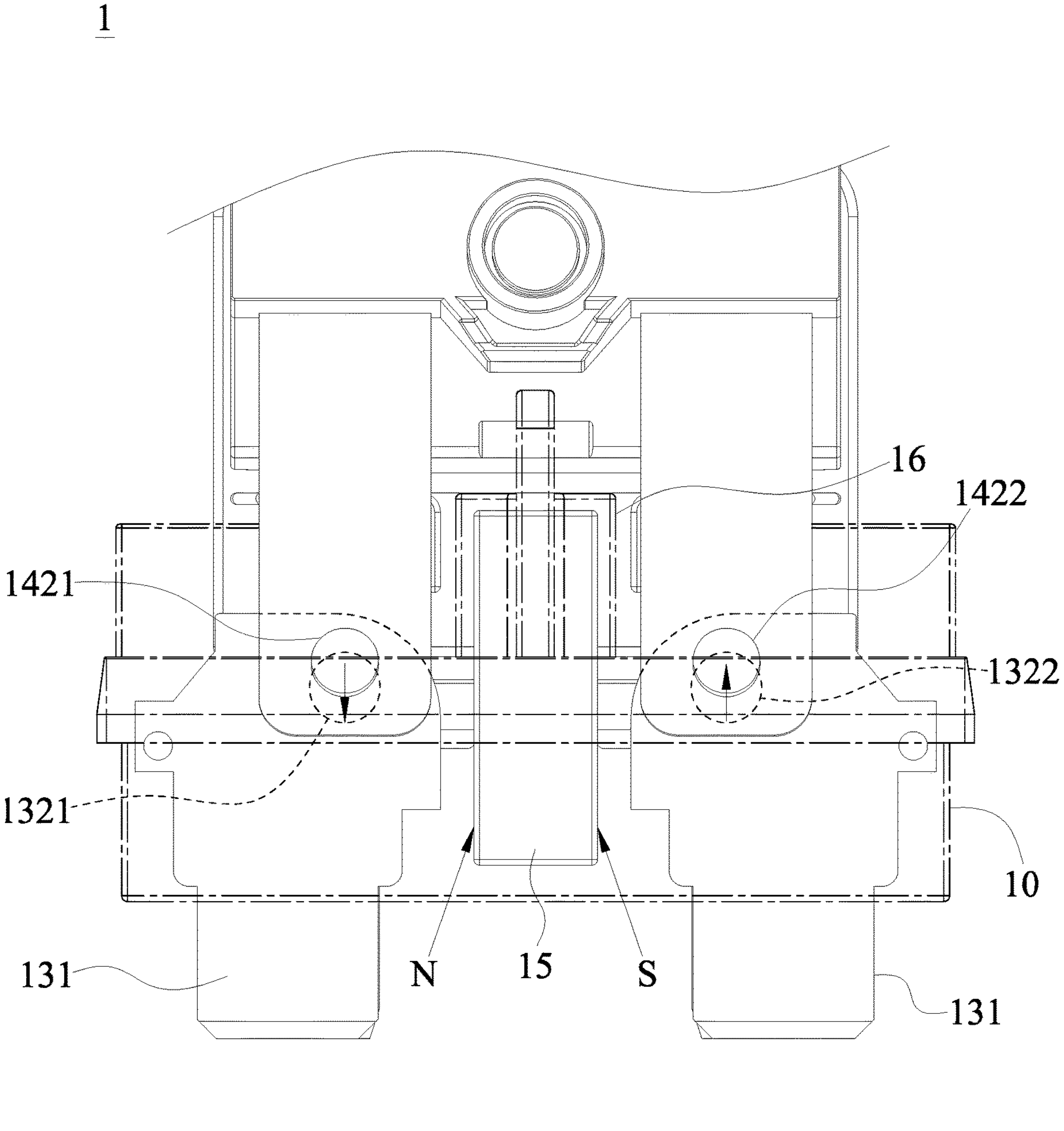
FIG. 5A is a first schematic view showing an application of a non-polarized snap-on electromagnetic relay of the present disclosure.
Figure 5B:
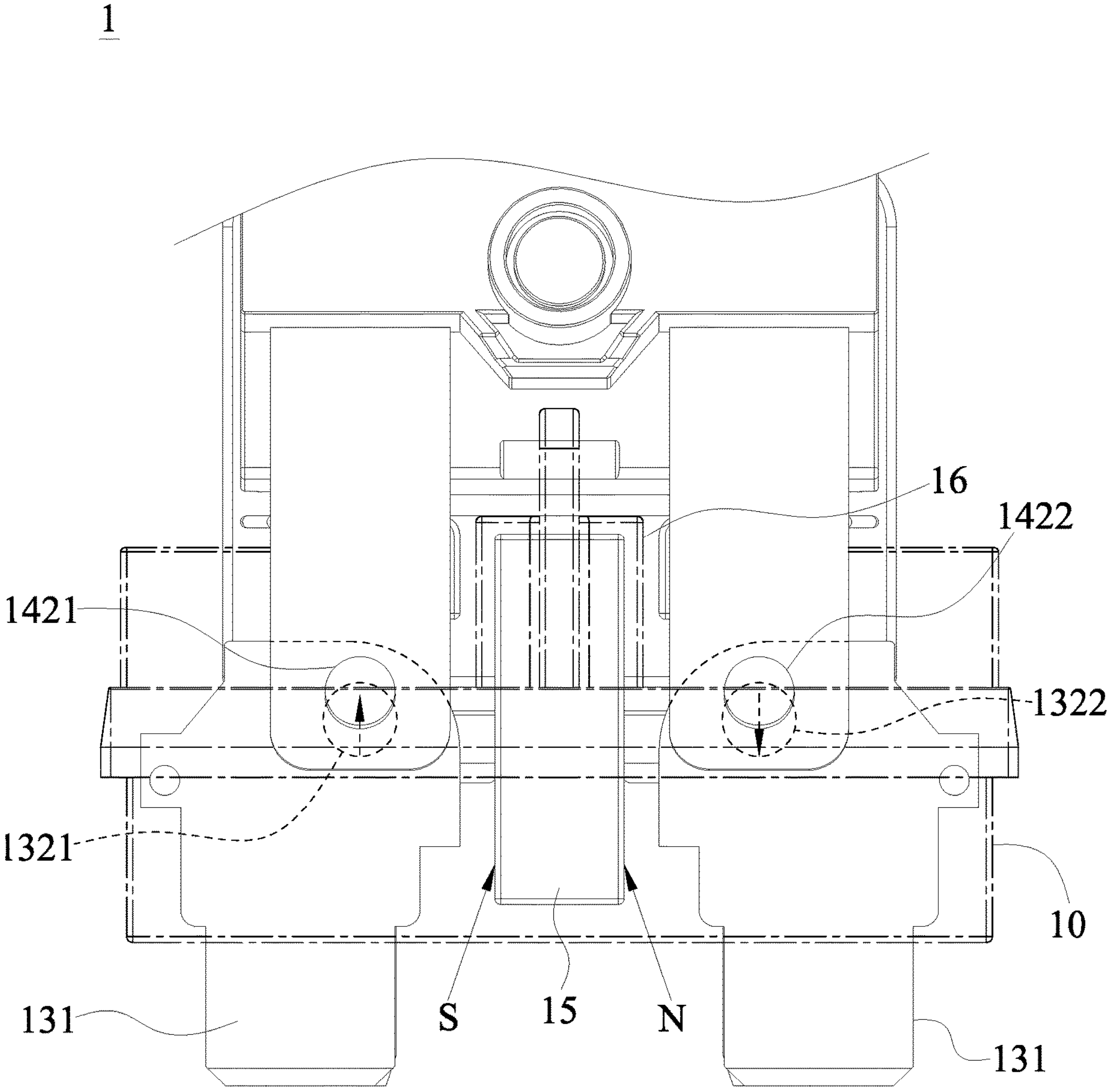
FIG. 5B is a second schematic view showing an application of a non-polarized snap-on electromagnetic relay of the present disclosure.

More specifically, as shown in FIGS. 5A and 5B, the strike-arc magnet 15 has a north pole and a south pole opposite to each other. When current flows in a direction from the first movable contact 1421 towards the first fixed contact 1321 and the first fixed contact 1321 and the first movable contact 1421 are close to the north pole of the strike-arc magnet 15, and far away from the magnetic field of the south pole of the strike-arc magnet 15, the strike-arc magnet 15 guides the electric arc to stretch in a direction towards the movable spring plate 141, and then the current on the other side flows in a direction from the second fixed contact 1322 towards the second movable contact 1422, the second fixed contact 1322 and the second movable contact 1422 are close to the south pole of the strike-arc magnet 15 and away from the magnetic field of the north pole of the strike-arc magnet 15, and the strike-arc magnet 15 stretches the electric arc, so that the electric arc is in contact with the base 10 to extinguish the electric arc as shown in FIG. 5A, or when current flows in a direction from the first fixed contact 1321 towards the first movable contact 1421, and the first fixed contact 1321 and the first movable contact 1421 are close to the south pole of the strike-arc magnet 15 and far away from the magnetic field of the north pole of the strike-arc magnet 15, the strike-arc magnet 15 guides the electric arc to stretch in a direction towards the movable spring plate 141, and then the current on the other side flows in a direction from the second movable contact 1422 towards the second fixed contact 1322, and the second fixed contact 1322 and the second movable contact 1422 are close to the north pole of the strike-arc magnet 15 and far away from the magnetic field of the south pole of the strike-arc magnet 15, and the strike-arc magnet 15 stretches the electric arc, so that the electric arc is in contact the base 10 to eliminate the electric arc as shown in FIG. 5B.

This structural configuration allows the electric arc to flow as far as possible in the direction towards the movable spring plate 141. Through the barrier block 16, the function of preventing the blocking part from not moving the electric arc in the aforementioned direction can be achieved. Electric arc is substantially the same as lightning, which is in principle usually in an arbitrary radiation state when there is no structural influence. In order to overcome this phenomenon and let the electric arc be eliminated effectively, the non-polarized snap-on electromagnetic relay 1 guides and eliminates the generated electric arc by means of the basic structure of the barrier block 16 and the strike-arc magnet 15 installed inside the barrier block 16. Further, when the non-polarized snap-on electromagnetic relay 1 is in the aforementioned configuration, it has the effect of flowing electric arc towards the movable spring plate 141 to eliminate the electric arc. In FIGS. 5A and 5B, N and S stand for the positions of the north and south poles of the strike-arc magnet 15 respectively.

Figure 6A:
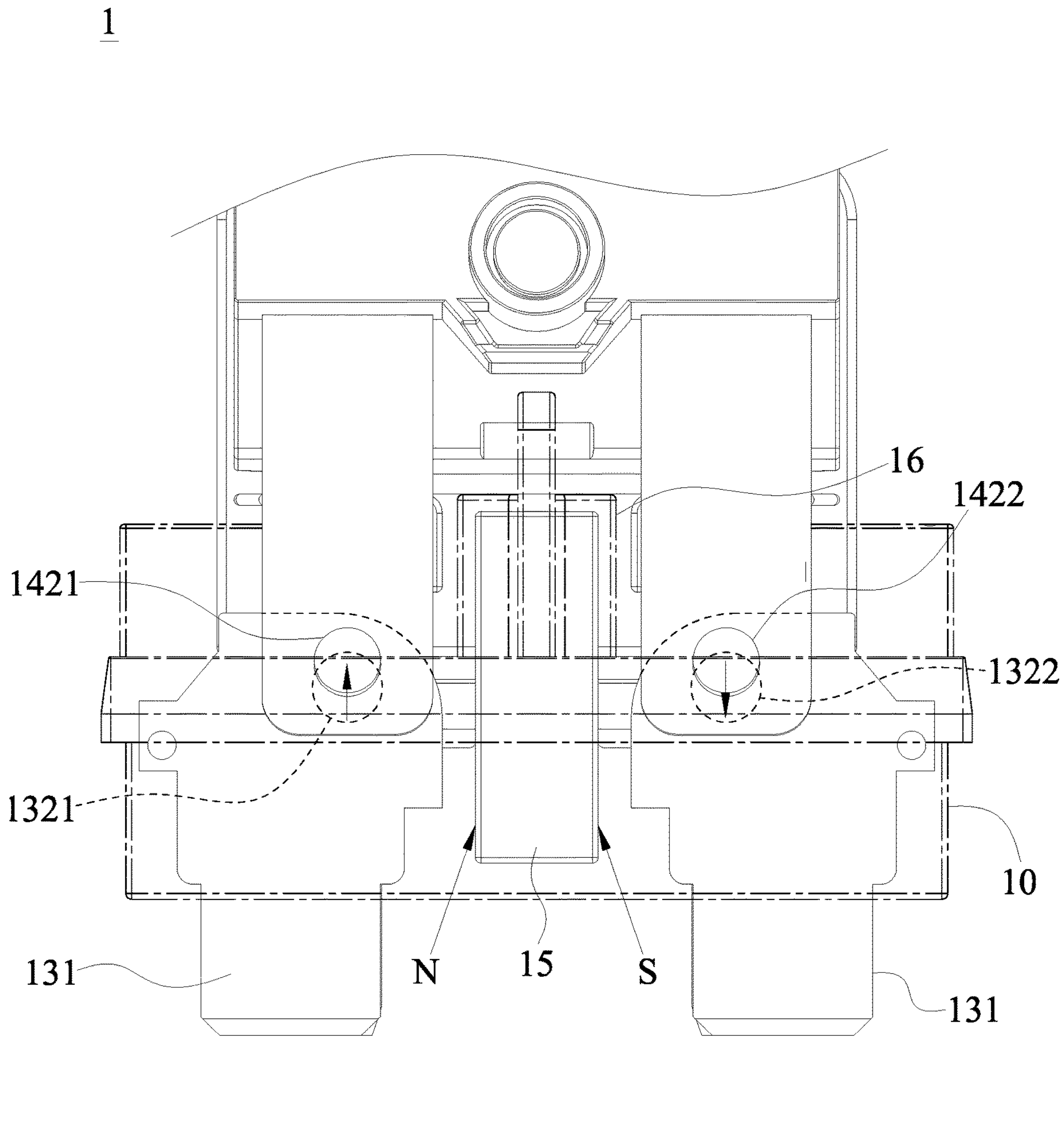
FIG. 6A is a third schematic view showing an application of a non-polarized snap-on electromagnetic relay of the present disclosure.
Figure 6B:
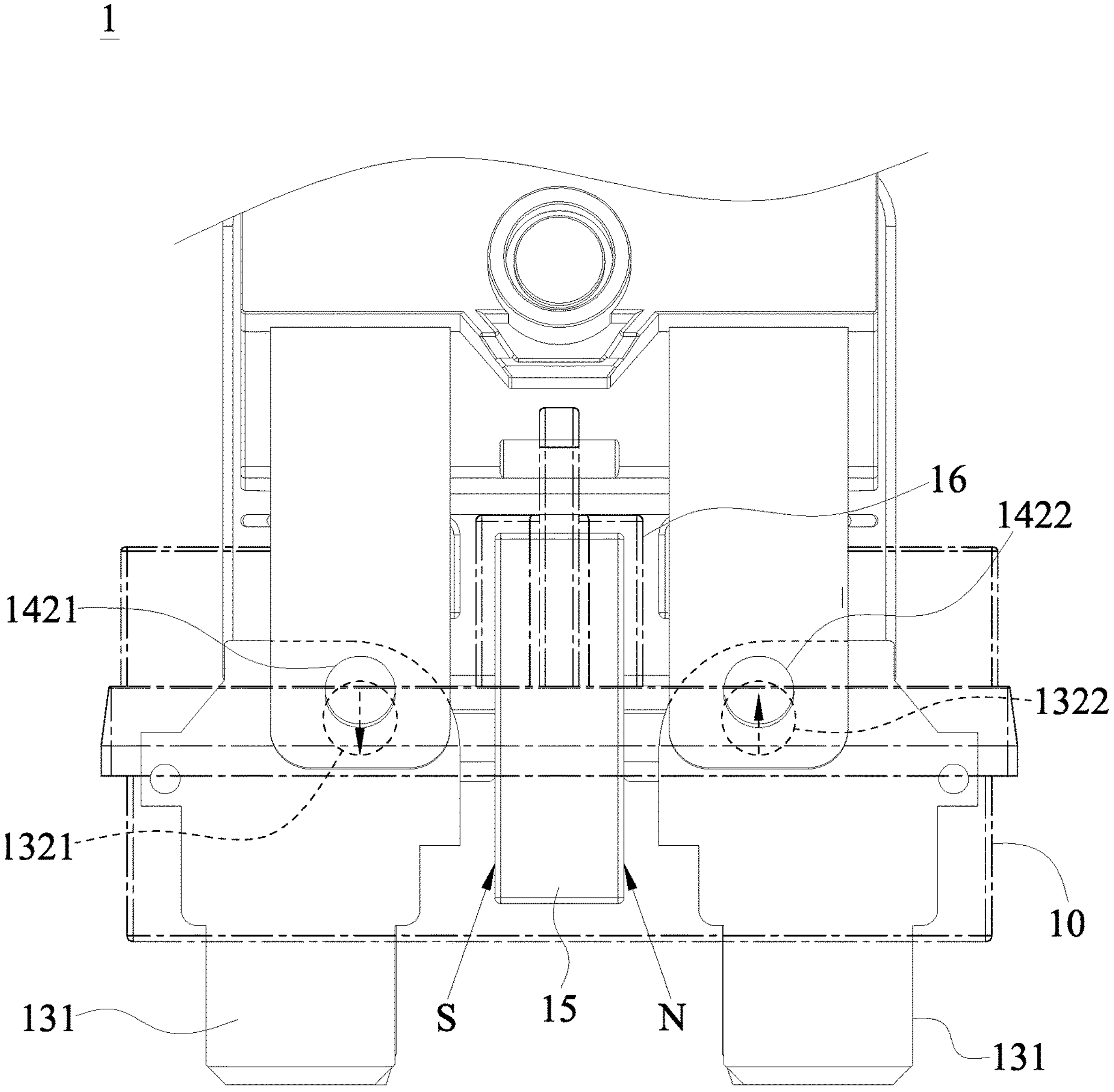
FIG. 6B is a fourth schematic view showing an application of a non-polarized snap-on electromagnetic relay of this disclosure.

In FIGS. 6A and 6B, when current flows in a direction from the second movable contact 1422 towards the second fixed contact 1322 and the second fixed contact 1322 and the second movable contact 1422 are close to the south pole of the strike-arc magnet 15 and far away from the magnetic field of the north pole of the strike-arc magnet 15, the strike-arc magnet 15 guides the electric arc to stretch in a direction towards the movable spring plate 141, and then the current on the other side flows in a direction from the first fixed contact 1321 towards the first movable contact 1421 and the first fixed contact 1321 and the first movable contact 1421 are close to the north pole of the strike-arc magnet 15 and far away from the magnetic field of the south pole of the strike-arc magnet 15, and the strike-arc magnet 15 stretches the electric arc, so that the electric arc is in contact with the base 10 and eliminates the electric arc as shown in FIG. 6A. When current flows in a direction from the second fixed contact 1322 towards the second movable contact 1422, and the second fixed contact 1322 and the second movable contact 1422 are close to the north pole of the strike-arc magnet 15 and far away from the magnetic field of the south pole of the strike-arc magnet 15, the strike-arc magnet 15 guides the electric arc to stretch in a direction towards the movable spring plate 141, and then the current on the other side flows in a direction from the first movable contact 1421 towards the first fixed contact 1321 and the first fixed contact 1321 and the first movable contact 1421 are close to the south pole of the strike-arc magnet 15 and far away from the magnetic field of the north pole of the strike-arc magnet 15, and the strike-arc magnet 15 stretches the electric arc, so that the electric arc is in contact with the base 10 to eliminate the electric arc as shown in FIG. 6A. In the above structure, it can mainly achieve the effect of guiding the electric arc towards the movable spring plate 141, so that the electric arc can be guided and extinguished as described below, and the barrier block 16 is further provided to target a part of the electric arc which is not in the radiating direction to be blocked and offset. In FIGS. 6A and 6B, N and S stand for the positions of the north and south poles of the strike-arc magnet 15 respectively.

Figure 1D:
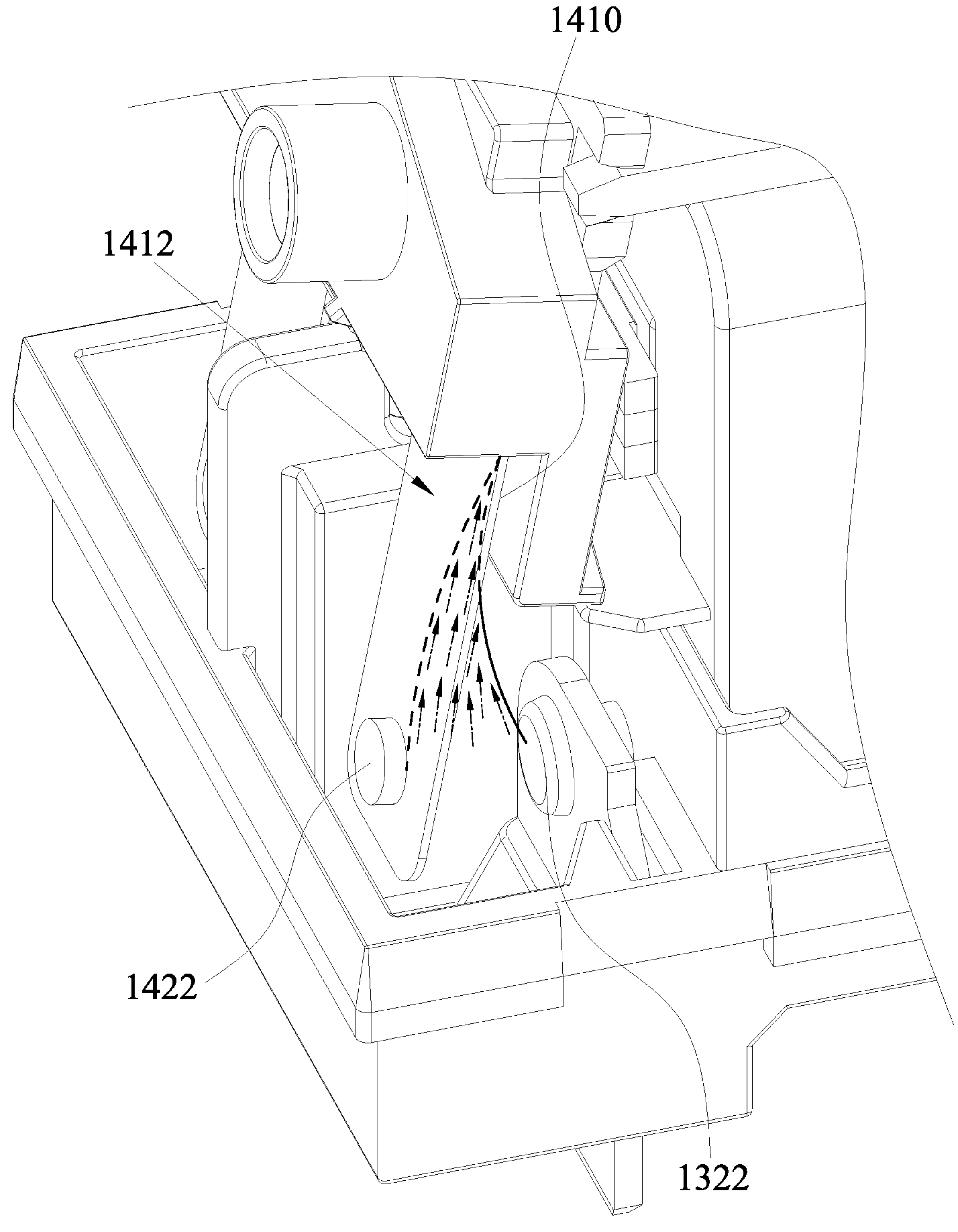
FIG. 1D is a second perspective view showing an application status of the present disclosure.
Figure 2A:
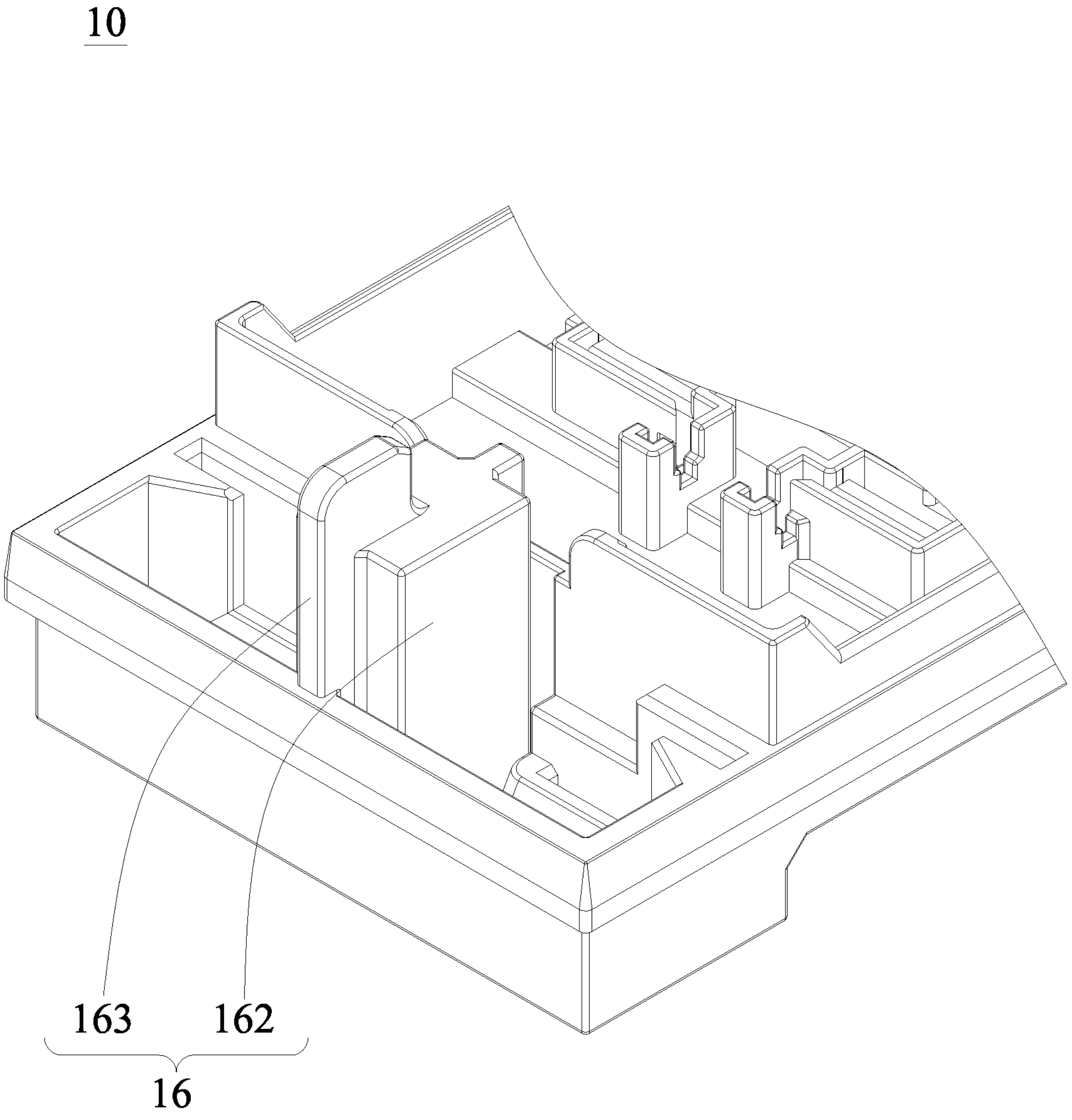
FIG. 2A is a perspective view showing the structure of a base of the present disclosure.
Figure 2B:
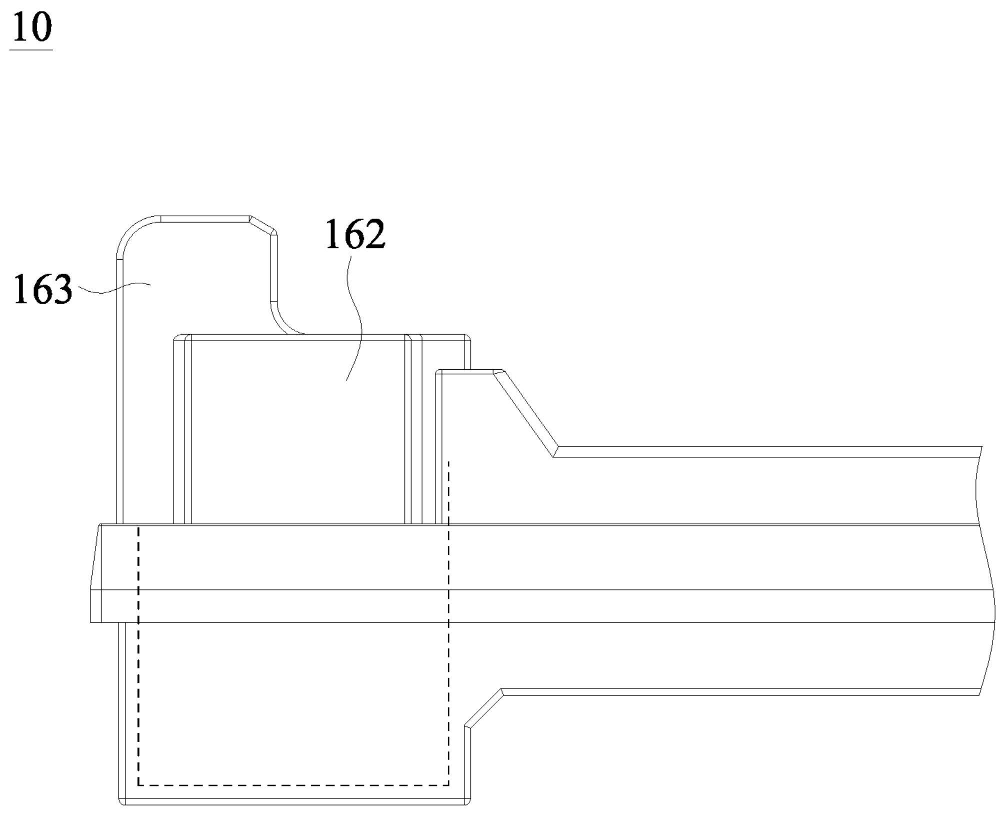
FIG. 2B is a side view showing the structure of a base of the present disclosure.
Figure 3:
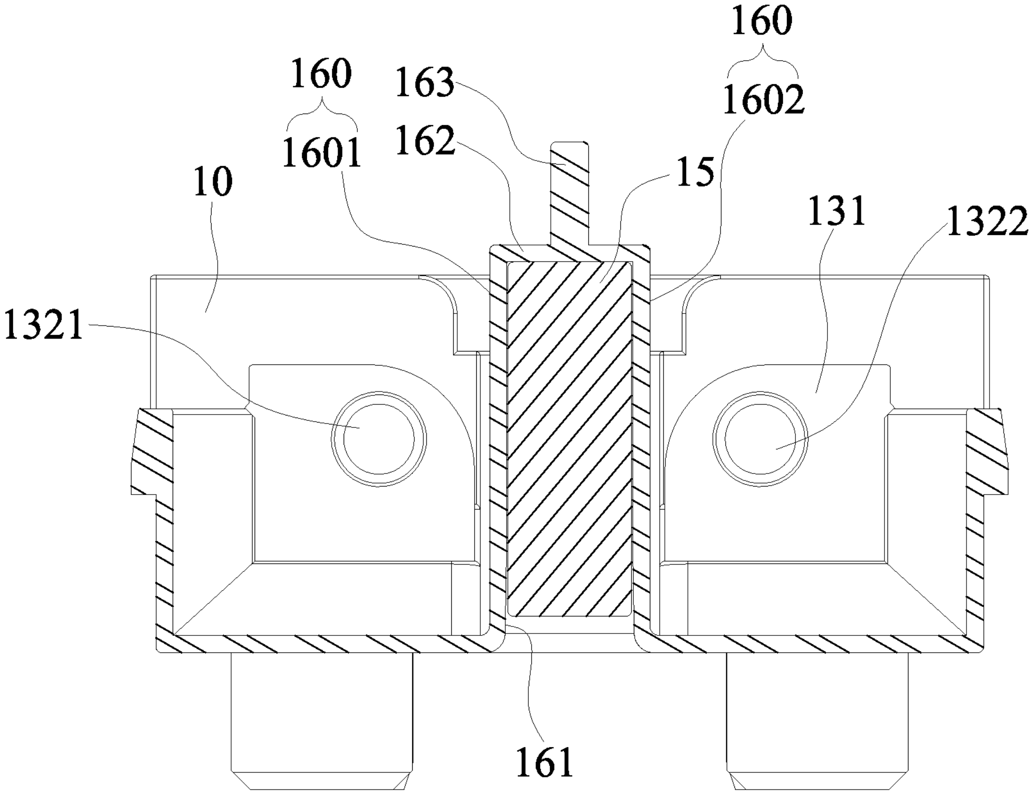
FIG. 3 is a partial cross-sectional view showing the structures of a base and a fixed contact assembly of the present disclosure.

In a preferred embodiment of the movable spring plate 141, the movable spring plate 141 includes an arc receiving portion 1410, and the arc receiving portion 1410 includes the connection section 1411 and two discharge sections 1412 that is exposed and arranged symmetrically. More specifically, the arc receiving portion 1410 is roughly defined as an area if the movable spring plate 141 is not used for setting the first movable contact 1421 and the second movable contact 1422, and a part of this area provided for connecting the link assembly 12 is defined as the connection section 1411, and the exposed sections in this area are defined as the discharge sections 1412 for attracting electric arc. In the structural mode of this embodiment as shown in FIGS. 1A and 1D, the arc receiving portion 1410 includes the movable spring plate 141 embedded into the connection section 1411 at the top of the link assembly 12 (which is indicated by the part enclosed by the dotted lines in FIG. 1A) and an area exposed from the link assembly 12, and the areas exposed from the link assembly 12 are defined as the discharge sections 1412 (which are the parts shown in FIGS. 1A and 1D, exposed from the link assembly 12, and having the first movable contact 1421 and the second movable contact 1422 at the proximate end positions). Through the structure of the arc receiving portion 1410 and the discharge sections 1412, when the first movable contact 1421 and the second movable contact 1422 on the left and right sides are detached from the first fixed contact 1321 and the second fixed contact 1322 respectively, the electric arc is conducted but not disconnected, the air around the discharge sections 1412 forms a higher electric field and is ionized, the ionized air has conductivity to produce a discharge phenomenon around the discharge section 1412 to attract the electric arc, the strike-arc magnet 15 guides the electric arc to stretch in a direction towards the arc receiving portion 1410 to reduce the energy density of the electric arc, the discharge sections 1412 on the arc receiving portion 1410 attract the stretched electric arc as indicated by the arc in FIG. 1D, where the arrow under the arc in FIG. 1D stands for the direction of magnetic field, and this allows the arc receiving portion 1410 to receive the energy of the electric arc and extinguish the electric arc. As a result, this disclosure uses the concept that lightning is an electric arc by nature, and leverage the discharge effect at the tip of a lightning conductor to attract lightning shock and prevent surrounding objects from being damaged by lightning, and the strike-arc magnet 15 in the relay guides the electric arc to stretch in a direction towards the arc receiving portion 1410 and reduce the energy density of the electric arc, and the discharge sections 1412 on the arc receiving portion 1410 attract the stretched electric arc, so that the arc receiving portion 1410 receives the energy of the electric arc (such as heat energy) to extinguish the electric arc, and the discharge effect at the tip of the lightning conductor can be used to attract the electric arc to prevent surrounding objects in the relay from being damaged by the electric arc.

In addition, the barrier block 16 further includes a double-sided energy absorption portion 160, and the double-sided energy absorption portion 160 includes a first absorption surface 1601 and a second absorption surface 1602 which are configured to be opposite to each other, and each absorption surface 1601, 1602 absorbs the heat energy of the electric arc, and the first absorption surface 1601 and the second absorption surface 1602 are non-magnetic polymers. The double-sided energy absorption portion 160 is provided to allow the electric arc to move towards the arc receiving portion 1410 to be in contact with the first absorption surface 1601 or the second absorption surface 1602 to absorb a part of the heat energy and reduce the damage to the relay caused by the electric arc, and then the arc receiving portion 1410 receives the energy of the electric arc (such as heat energy) to extinguish the electric arc.

Preferably, the barrier block 16 includes a basal portion 162 and a protruding portion 163, the basal portion 162 is a rectangular structure, the protruding portion 163 is substantially L-shaped and in a status of protruding from the front and top of the basal portion 162, and more preferably protruding from the central position of the basal portion 162. The strike-arc magnet 161 is disposed in the basal portion 162. As to the barrier block 16, the installation of the strike-arc magnet 15 and the purpose of achieving the non-polarized application are taken into account, and thus the barrier block 16 is a structure having the basal portion 162 and the protruding portion 163, firstly making the protruding portion 163 to be protruded from the basal portion 162, and expanding the functioning area of the barrier block 16 through the protruding portion 162, which is more favourable for blocking the electric arc generated during operation, and ensuring the blocking and elimination of the electric arc; and secondly using the structure of the basal portion 162 to accommodate the strike-arc magnet 15 to maximize the spatial utility of the base 10, and there is no need of setting up the strike-arc magnet 15 between the two fixed conductive plates 131, or reserving the corresponding space in the base 10, which is complicated and inconvenient to production. In addition, when the double-sided energy absorption portion 160 is present, the double-sided energy absorption portion 160 can be a partial structure of the basal portion 162, that is, the double-sided energy absorption portion 160 is disposed on the basal portion 162; and of course, it can also be a structural block different from the basal portion 162.

When the barrier block 16 is a structure having the basal portion 162 and the protruding portion 163, the non-polarized snap-on electromagnetic relay 1 can be used in the power range of 600V DC and 10~50 A, and the aforementioned structural characteristics achieve the effect of blocking and extinguishing the electric arc. Through the special structure of the barrier block 16, the electric arc can be blocked and extinguished to achieve the "non-polarized" application of the electromagnetic relay.

The non-polarized snap-on electromagnetic relay 1 can be used in the applications that require a large current transmission to carry a larger current. In addition, the barrier block 16 can be made of an organic or inorganic polymer, such as nylon, liquid crystal polymer (LCP), silicon dioxide, thermoplastic, etc.

Figure 4:
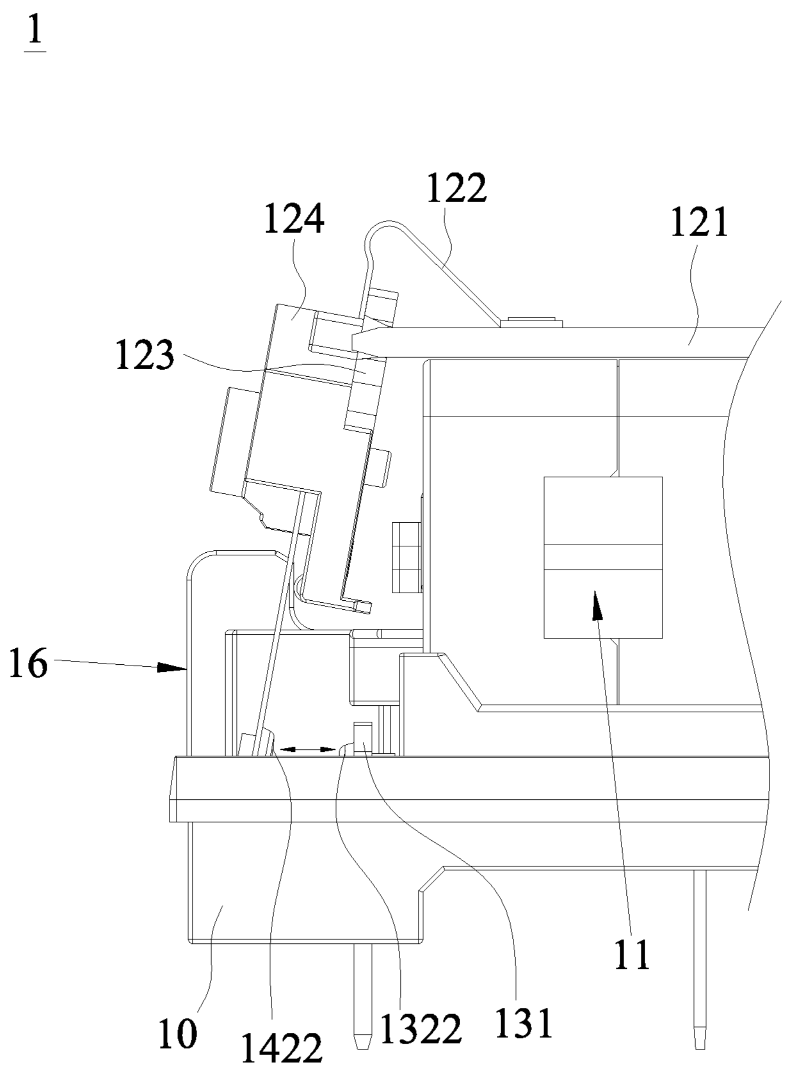
FIG. 4 is a side view of a non-polarized snap-on electromagnetic relay of this disclosure.

In a preferred embodiment of the link assembly 12 as shown in FIGS. 1A and 4, the link assembly 12 includes a bracket 121, an elastic member 122, a magnetic member 123 and a fixing member 124. The bracket 121 is installed to the solenoid coil assembly 11, an end of the elastic member 122 is fixed to the bracket 121, the other end of the elastic member 122 is fixed to the magnetic member 123, the fixing member 124 is installed to the magnetic member 123, and the connection section 1411 of the movable spring plate 141 is installed to the fixing member 124 When the solenoid coil assembly 11 generates a magnetic force, the magnetic member 123 is attracted by the solenoid coil assembly 11 to drive the fixing member 124, so that the first movable contact 1421 and the second movable contact 1422 are in contact with the first fixed contact 1321 and the second fixed contact 1322 respectively, and in the meantime, a force is applied to the elastic member 122. When the solenoid coil assembly 11 has not generated a magnetic force, the magnetic member 123 and the fixing member 124 are restored by the action force of the elastic member 122, so that the first movable contact 1421 and the second movable contact 1422 are detached from the first fixed contact 1321 and the second fixed contact 1322 respectively. Through the aforementioned structure, it is favourable to stably drive the movable contact assembly 14 to move, where the elastic member 122 is a spring or a spring plate.

What is claimed is:

1. A non-polarized snap-on electromagnetic relay, arbitrarily connecting two electrodes for electrical conduction to execute a charging or discharging operation without a need of considering positive and negative polarity, the non-polarized snap-on electromagnetic relay comprising a base, a solenoid coil assembly, a link assembly, a fixed contact assembly, and a movable contact assembly; the solenoid coil assembly, the link assembly, the fixed contact assembly, and the movable contact assembly being disposed on the base; the link assembly being installed on a side of the solenoid coil assembly and operated according to a driving status of the solenoid coil assembly, wherein:

the fixed contact assembly comprises two fixed conductive plates, a first fixed contact, and a second fixed contact, the two fixed conductive plates are symmetrically arranged with an end extending out of the base, the first fixed contact is disposed on any one of the two fixed conductive plates, the second fixed contact is disposed on another one of the fixed conductive plates; the movable contact assembly comprises a movable spring plate, a first movable contact, and a second movable contact, the movable spring plate has a gap formed by inwardly extending an end thereof, the first movable contact and the second movable contact are disposed on the movable spring plate, installed on two sides of the gap, and configured to be corresponsive to the first fixed contact and the second fixed contact respectively, the movable spring plate comprises a connection section defined on an end away from the first movable contact and the second movable contact, the connection section is linked by the link assembly to allow the first movable contact and the second movable contact to contact with or detach from the first fixed contact and the second fixed contact; the base comprises a barrier block disposed between the two fixed conductive plates, the movable spring plate is set across the barrier block, so that a stroke movement of the first movable contact and the second movable contact takes place on two sides of the barrier block, and the barrier block comprises a strike-arc magnet, and the movable spring plate comprises an arc receiving portion, and the arc receiving portion comprises the connection section and two discharge sections arranged symmetrically, the two discharge sections attract the electric arc, the strike-arc magnet guides the electric arc to stretch in a direction towards the arc receiving portion to reduce an energy density of the electric arc, and the two discharge sections of the arc receiving portion attract the stretched electric arc, so that the arc receiving portion receives remaining energy of the electric arc to extinguish the electric arc.

2. The non-polarized snap-on electromagnetic relay according to claim 1, wherein the strike-arc magnet has a north pole and a south pole opposite to each other, and when a current flows in a direction from the first movable contact towards the first fixed contact and the first fixed contact and the first movable contact are close to the north pole of the strike-arc magnet and away from a magnetic field of the south pole of the strike-arc magnet, the strike-arc magnet guides an electric arc to stretch in a direction towards the movable spring plate, or when a current flows in a direction from the first fixed contact towards the first movable contact and the first fixed contact and the first movable contact are close to the south pole of the strike-arc magnet and away from a magnetic field of the north pole of the strike-arc magnet, the strike-arc magnet guides the electric arc to stretch in the direction towards the movable spring plate.

3. The non-polarized snap-on electromagnetic relay according to claim 2, wherein the barrier block further comprises a basal portion and a protruding portion, the protruding portion is substantially L-shaped and in a status of protruding from a front side and a top side of the basal portion, the link assembly comprises a bracket, an elastic member, a magnetic member, and a fixing member, the bracket is coupled to the solenoid coil assembly, an end of the elastic member is fixed to the bracket, another end of the elastic member is fixed to the magnetic member, the fixing member is disposed on the magnetic member, and the connection section of the movable spring plate is disposed on the fixing member.

4. The non-polarized snap-on electromagnetic relay according to claim 2, wherein the barrier block further comprises a double-sided energy absorption portion, the double-sided energy absorption portion comprises a first absorption surface and a second absorption surface configured to be opposite to each other, and each of the first absorption surface and the second absorption surface absorbs heat energy of the electric arc, and the first absorption surface and the second absorption surface are non-magnetic polymers.

5. The non-polarized snap-on electromagnetic relay according to claim 4, wherein the barrier block further comprises a basal portion and a protruding portion, the protruding portion is substantially L-shaped and in a status of protruding from a front side and a top side of the basal portion, the link assembly comprises a bracket, an elastic member, a magnetic member, and a fixing member, the bracket is coupled to the solenoid coil assembly, an end of the elastic member is fixed to the bracket, another end of the elastic member is fixed to the magnetic member, the fixing member is disposed on the magnetic member, and the connection section of the movable spring plate is disposed on the fixing member.

6. The non-polarized snap-on electromagnetic relay according to claim 1, wherein the barrier block further comprises a basal portion and a protruding portion, the protruding portion is substantially L-shaped and in a status of protruding from a front side and a top side of the basal portion, the link assembly comprises a bracket, an elastic member, a magnetic member, and a fixing member, the bracket is coupled to the solenoid coil assembly, an end of the elastic member is fixed to the bracket, another end of the elastic member is fixed to the magnetic member, the fixing member is disposed on the magnetic member, and the connection section of the movable spring plate is disposed on the fixing member.

7. The non-polarized snap-on electromagnetic relay according to claim 1, wherein the strike-arc magnet has a north pole and a south pole opposite to each other, and when a current flows in a direction from the second movable contact towards the second fixed contact and the second fixed contact and the second movable contact are close to the south pole of the strike-arc magnet and away from a magnetic field of the north pole of the strike-arc magnet, the strike-arc magnet guides an electric arc to stretch in a direction towards the movable spring plate, or when a current flows in a direction from the second fixed contact towards the second movable contact and the second fixed contact and the second movable contact are close to the north pole of the strike-arc magnet and away from a magnetic field of the south pole of the strike-arc magnet, the strike-arc magnet guides the electric arc to stretch in the direction towards the movable spring plate.

8. The non-polarized snap-on electromagnetic relay according to claim 7, wherein the barrier block further comprises a basal portion and a protruding portion, the protruding portion is substantially L-shaped and in a status of protruding from a front side and a top side of the basal portion, the link assembly comprises a bracket, an elastic member, a magnetic member, and a fixing member, the bracket is coupled to the solenoid coil assembly, an end of the elastic member is fixed to the bracket, another end of the elastic member is fixed to the magnetic member, the fixing member is disposed on the magnetic member, and the connection section of the movable spring plate is disposed on the fixing member.

9. The non-polarized snap-on electromagnetic relay according to claim 7, wherein the barrier block further comprises a basal portion and a protruding portion, the protruding portion is substantially L-shaped and in a status of protruding from a front side and a top side of the basal portion, the link assembly comprises a bracket, an elastic member, a magnetic member, and a fixing member, the bracket is coupled to the solenoid coil assembly, an end of the elastic member is fixed to the bracket, another end of the elastic member is fixed to the magnetic member, the fixing member is disposed on the magnetic member, and the connection section of the movable spring plate is disposed on the fixing member.

10. The non-polarized snap-on electromagnetic relay according to claim 7, wherein the barrier block further comprises a double- sided energy absorption portion, the double-sided energy absorption portion comprises a first absorption surface and a second absorption surface configured to be opposite to each other, each of the first and second absorption surfaces absorbs heat energy of the electric arc, and the first absorption surface and the second absorption surface are non-magnetic polymers.

11. The non-polarized snap-on electromagnetic relay according to claim 10, wherein the barrier block further comprises a basal portion and a protruding portion, the protruding portion is substantially L-shaped and in a status of protruding from a front side and a top side of the basal portion, the link assembly comprises a bracket, an elastic member, a magnetic member, and a fixing member, the bracket is coupled to the solenoid coil assembly, an end of the elastic member is fixed to the bracket, another end of the elastic member is fixed to the magnetic member, the fixing member is disposed on the magnetic member, and the connection section of the movable spring plate is disposed on the fixing member.

* * * * *